United States Patent [19]

Freychet et al.

[11] 4,161,193
[45] Jul. 17, 1979

[54] OPEN DUCTS DESIGNED FOR READY DISASSEMBLY AND RE-USE

[75] Inventors: Aimé Freychet, Grenoble; André Gouzy, St-Ismier, both of France

[73] Assignee: Commissariat a l'Energie Atomique, Paris, France

[21] Appl. No.: 725,856

[22] Filed: Sep. 23, 1976

Related U.S. Application Data

[63] Continuation of Ser. No. 545,565, Jan. 30, 1975, abandoned.

[51] Int. Cl.² .............................................. F16L 11/12
[52] U.S. Cl. .............................. 138/103; 138/107; 138/178; 165/45; 405/131; 47/1.42; 47/19
[58] Field of Search ............... 138/178, 103, 92, 107; 193/25 R, 25 AC, 25 S; 302/64; 165/45; 5/120, 123, 127; 61/36 A; 297/277; 47/1.42, 19; 126/271.1, 271.2 R

[56] References Cited

U.S. PATENT DOCUMENTS

| 355,994 | 1/1887 | Horwitz | 193/25 R |
|---|---|---|---|
| 920,296 | 5/1909 | Erwin et al. | 193/25 A |
| 952,315 | 3/1910 | Erwin et al. | 193/25 A |
| 1,119,573 | 12/1914 | Byrum | 138/92 |
| 1,709,844 | 4/1929 | Durant | 138/109 |
| 1,838,623 | 12/1931 | Hersey et al. | 138/107 X |
| 2,222,497 | 11/1940 | Bins | 138/107 |
| 3,762,171 | 10/1973 | Bjorheim et al. | 61/36 A |
| 3,994,366 | 11/1976 | Okuma et al. | 193/25 R X |

Primary Examiner—Richard E. Aegerter
Assistant Examiner—James E. Bryant, III
Attorney, Agent, or Firm—Lane, Aitken & Ziems

[57] ABSTRACT

Open ducts for ground heating of hothouses consist of flattened tubes of flexible material such as plastic. The tubes are slit open lengthwise, folded back over tensioned cords and secured by fasteners so as to form the edges of the ducts, the two ends of which remain tubular and are connected to the inlet and outlet pipes of a warm-water circulation system.

4 Claims, 3 Drawing Figures

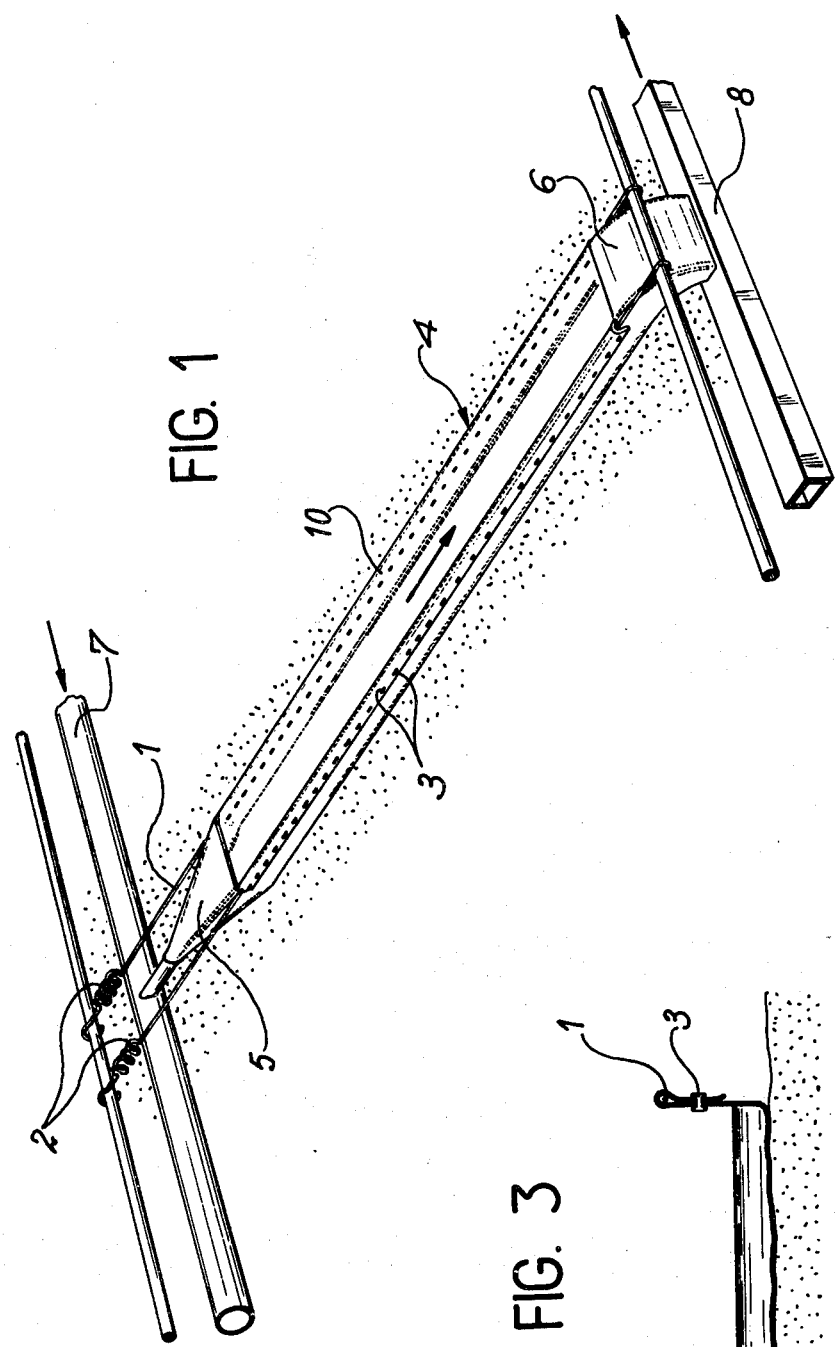
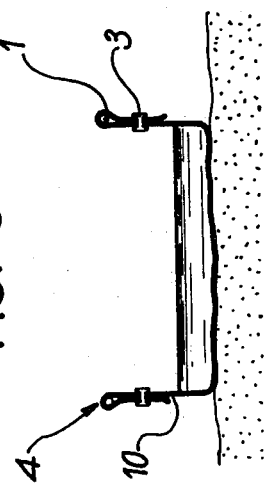

OPEN DUCTS DESIGNED FOR READY DISASSEMBLY AND RE-USE

This is a continuation of application Ser. No. 545,565 filed Jan. 30, 1975 now abandoned.

A method of heating developed for hothouses consists in circulating water at relatively low temperature within open ducts.

Ducts of this type are at present constructed by making use of plastic sheets placed within wooden channels. The disadvantage of these ducts lies in the difficulty involved in disassembly.

This invention relates to ducts which can be constructed both simply and economically, which can readily be disassembled, which can be stored in a small space, thus permitting the preparation of the soil for the cultivation of plants, and which can be very readily used again.

The ducts in accordance with the invention are essentially constituted by flattened tubes of flexible material which are slit open longitudinally over only part of their length, the portion which has thus been slit open being lifted so as to form the edges of the ducts, the two extremities of the tubes being retained in their initial form so as to facilitate connections.

The flattened tubes of flexible material are preferably constituted by sheaths of plastic material.

In one important embodiment of the invention, the lifted edges of the flattened tubes forming the ducts are fixed on two elastically mounted and flexible cords which permit rolling-up of the complete assembly consisting of tubes and cords without any risk of damage. The complete assembly can thus be readily unrolled for subsequent use and replaced in the hothouses.

Forming of the edges of the flattened tubes over the cords mentioned above can be effected by means of fasteners so as to form a clipped hem.

The ducts thus arranged are supplied under a head of exactly the minimum value required for the circulation and complete filling of the bottom of the duct while preventing overflow at the extremities.

The ducts in accordance with the invention permit heating of the ground by means of water at low temperature since heat-transfer processes take place very readily through the flexible material.

Referring to the accompanying diagrammatic FIGS. 1 to 3, there will now be described a number of different examples of practical application of open ducts in accordance with the invention which can be disassembled and used again, these examples being given without any limitation being implied. The practical arrangements which will be described in connection with these examples must be considered as forming part of the invention although it will be understood that any equivalent arrangements could equally well be employed without thereby departing from the scope of this invention.

The figures show only the elements which are necessary in order to gain an understanding of the invention, corresponding elements in the different figures being designated by identical reference numerals.

FIG. 1 is a perspective view of a duct in accordance with the present invention.

FIG. 3 is a sectional view of a duct in accordance with the invention.

Figure 2:
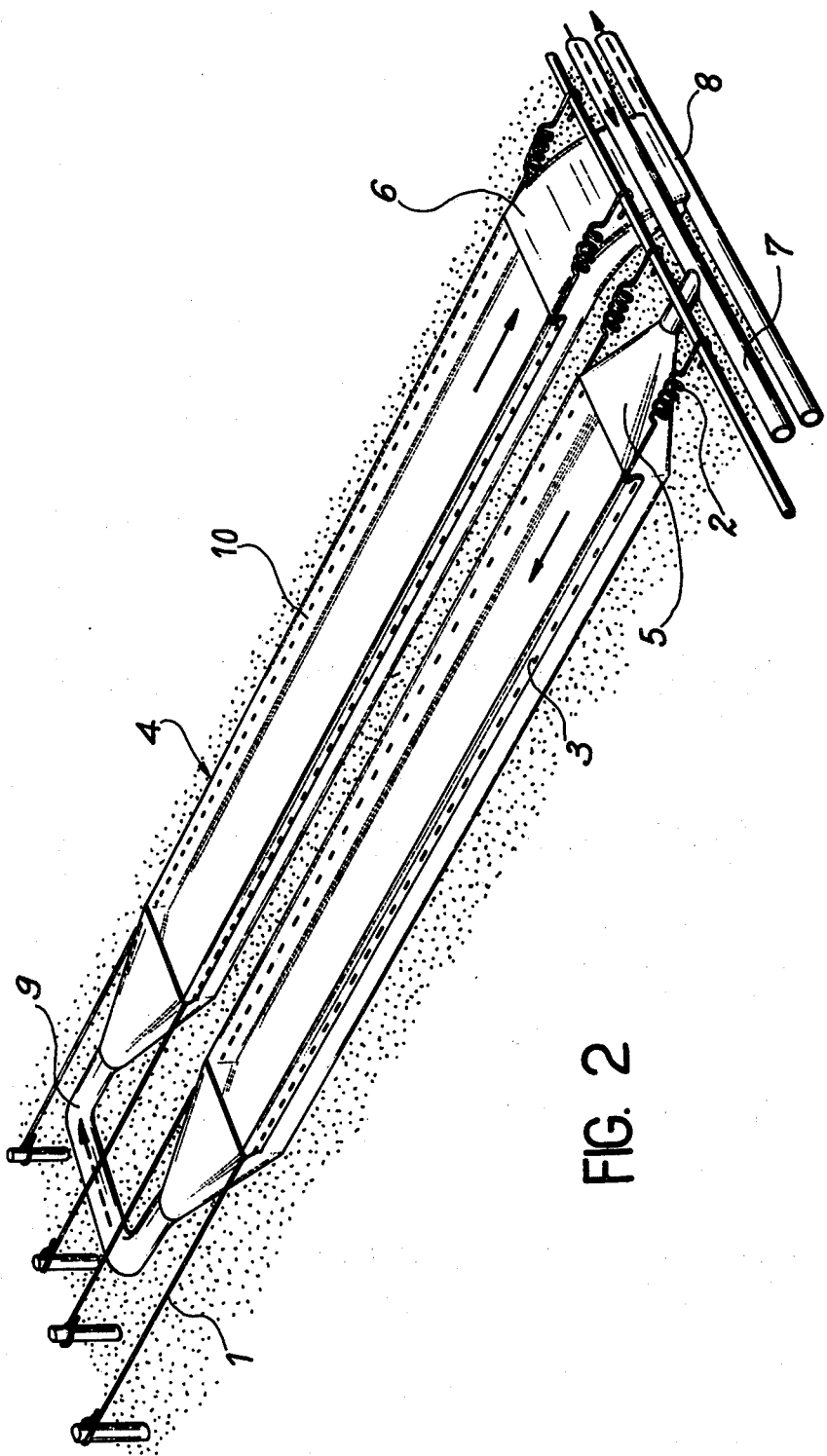
FIG. 2 is a perspective view of two ducts in accordance with the invention, these ducts being mounted in series.

The duct 4 which is shown in FIG. 1 and formed by means of a plastic sheath 10 is installed on the ground between two flexible cords 1 of "nylon," for example, and having a small diameter of the order of approximately 3 mm. Said cords are stretched by means of elastic tensioning members 2 at a height of about 5 cm from the ground and spaced at a distance from each other which depends on the width of the sheath employed and corresponds approximately to the initial width of the sheath. The two portions which are cut from the sheath are then folded over the cords and attached by means of fasteners 3 immediately beneath the cords as shown in FIG. 3.

At each extremity 5 and 6, the sheath remains intact over a length of 300 mm, thus making it possible to connect said sheath to the supply header-pipe 7 and to the flow within the discharge duct 8.

Since the cords associated with the sheath are very flexible and therefore make it possible to roll-up this latter very easily after having disconnected either the supply or the return of water in order to permit the operation of soil-cultivating equipment.

Another arrangement shown in FIG. 2 corresponds to a return circulation system in which the supply and return of water take place on the same side and serve to gain free access to the hothouse from the opposite extremity without requiring any disconnection and simply by winding the sheaths onto a drum provided for this purpose.

The connection between the outgoing duct and return duct is provided by a rigid pipe-bend 9.

There can be seen in FIG. 3 the duct 4 formed by means of the sheath 10 which is secured to the cord 1 by means of the fasteners 3.

What we claim is:

1. An open duct for heating the surface under said duct by circulation of a liquid through the duct, said duct comprising a length of heat transfer material, flexible enough to be rolled and unrolled and incapable of supporting itself, the duct including two end portions having a top, bottom and sides formed of said material, means for introducing fluid into the duct through one end portion, means for receiving fluid flowing from the duct through the other end portion, the duct further including an open portion between said end portions having a bottom and sides formed of said material, the bottom engaging the surface being heated and being flattened by the weight of the fluid, the open portion including means for holding and supporting the sides of said open portion above the surface to be heated along the full length thereof to prevent liquid flowing through said duct from spilling over the sides of the open portion.

2. The open duct in claim 1, wherein the means for holding and supporting includes the upper edge of both sides of the open portion comprising a loop formed by folding an extension of the sides over the sides and connecting the extension to the sides.

3. The open duct in claim 2, wherein the loops are formed along the full lengths of the sides of the open portion.

4. The open duct in claim 2, wherein the means for holding and supporting further includes a flexible cord held in tension inserted through each of the loops.

* * * * *